(12) United States Patent
Jimenez-Gomez

(10) Patent No.: US 8,089,650 B2
(45) Date of Patent: Jan. 3, 2012

(54) CONNECTED OFFLINE FINISHING DEVICES

(75) Inventor: Javier Jimenez-Gomez, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 1287 days.

(21) Appl. No.: 11/789,645

(22) Filed: Apr. 25, 2007

(65) Prior Publication Data

US 2008/0266591 A1 Oct. 30, 2008

(51) Int. Cl.
*G06F 3/12* (2006.01)
*G06F 17/00* (2006.01)
*G06F 7/00* (2006.01)
*H04N 1/00* (2006.01)
*G06K 7/00* (2006.01)

(52) U.S. Cl. ....... 358/1.15; 358/1.13; 358/1.1; 358/401; 705/29; 705/30; 235/375; 235/376; 235/435

(58) Field of Classification Search ............. 358/1.15, 358/1.13, 1.1, 401, 501, 504; 399/79; 705/29, 705/30; 235/375, 376, 435
See application file for complete search history.

(56) References Cited

U.S. PATENT DOCUMENTS

| | | | |
|---|---|---|---|
| 6,633,821 B2 * | 10/2003 | Jackson et al. | 702/56 |
| 2006/0028662 A1 | 2/2006 | Dobrovolsky | 358/1.9 |
| 2006/0092024 A1 * | 5/2006 | Kim et al. | 340/572.1 |
| 2006/0225570 A1 | 10/2006 | Levine et al. | 95/109 |
| 2006/0266818 A1 * | 11/2006 | Oyama | 235/376 |
| 2007/0017985 A1 * | 1/2007 | Lapstun et al. | 235/435 |

* cited by examiner

*Primary Examiner* — Thomas Lett
(74) *Attorney, Agent, or Firm* — Alix, Yale & Ristas, LLP

(57) ABSTRACT

A print shop includes at least one printing device adapted to print a print job. A central computer is in communication with the printing device. An offline finishing device includes a reader device, adapted to read a job identifier carried on the print job, and a wireless transceiver in communication with the reader device and a central computer wireless transceiver.

7 Claims, 3 Drawing Sheets

CONNECTED OFFLINE FINISHING DEVICES

BACKGROUND

This disclosure relates generally to print shop production apparatus. More particularly, the present disclosure relates to print shop finishing devices.

In a conventional print shop, fulfillment of an order for books, pamphlets, brochures, etc. requires several different devices. Orders are tracked using an order tracking system, printed using a digital printer device and later finished using one or more offset finisher devices. From the order tracking system, a job ticket is generated with all the information needed for the job. This job ticket is often used electronically to set up the printing device. However, many print shop finishing devices are not in communication with the order tracking system and must be manually configured to perform the specific tasks required by the job ticket. Setting the finishing devices can often lead to problems and loss of printed materials if they are not configured properly. Also, since the finishing devices are not in communication with the order tracking system, tracking of the job must be done manually once it leaves the printing device.

SUMMARY

There is provided a connected offline finishing device comprising an offline finishing device, a reader device associated with the offline finishing device, and a wireless transceiver in communication with the reader device and the offline finishing device. The reader device is adapted to read a job identifier carried on a print job.

The reader device may be an optical scanning device or an electronic data storage device reader device.

There is also provided a print shop comprising at least one printing device adapted to print a print job. A central computer having a wireless transceiver is in communication with the printing device. An offline finishing device includes a reader device adapted to read a job identifier carried on the print job, and a wireless transceiver in communication with the reader device and the central computer wireless transceiver.

The printing device incorporates the job identifier with the print job. If the job identifier is a printed mark, printed by the printing device on the print job, the reader device is an optical scanning device. If the job identifier is data, stored in an electronic data storage device by the printing device, the reader device is an electronic data storage device reader.

The print shop may further comprise a pre-press processing system in communication with the central computer and the printing device. The pre-press processing system assigns the job identifier and transmits the job identifier to the printing device.

There is further provided a method of finishing printed products comprising assigning a unique job identifier to each print job received by a print shop. A printing device prints the print job and incorporates the job identifier in the print job. An offline finishing device finishes the print job by reading the job identifier with a reader device, querying a central computer for finishing information for the print job associated with the job identifier, and performing a finishing operation identified by the central computer.

The method may further comprise receiving each new print job at an order tracking system. The order tracking system generates job files and a job ticket and transmits the job files and job ticket to a pre-press processing system. The pre-press processing system generates the unique job identifier and associates the job identifier with the job files and job ticket.

Querying the central computer comprises transmitting the job identifier and identification information for the offline finishing device to the order tracking system with a wireless transceiver associated with the offline finishing device and transmitting the job ticket to the offline finishing device with a wireless transceiver associated with the order tracking system.

The method may further comprise monitoring completion of the print job with the order tracking system by reporting completion of the finishing operation to the order tracing system with the wireless transceiver associated with the offline finishing device Performing the finishing operation comprises reading the job ticket finishing information associated with the offline finishing device, and configuring the offline finishing device as required by the job ticket finishing information.

If the job identifier is a printed mark, incorporating the job identifier in the print job comprises printing the printed mark on the print job while printing the print job. If the job identifier is electronic data, incorporating the job identifier in the print job may comprise storing the job identifier in an electronic data storage device mounted to the print job. Alternatively, incorporating the job identifier in the print job may comprise printing an electronic data storage device including the job identifier on the print job.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
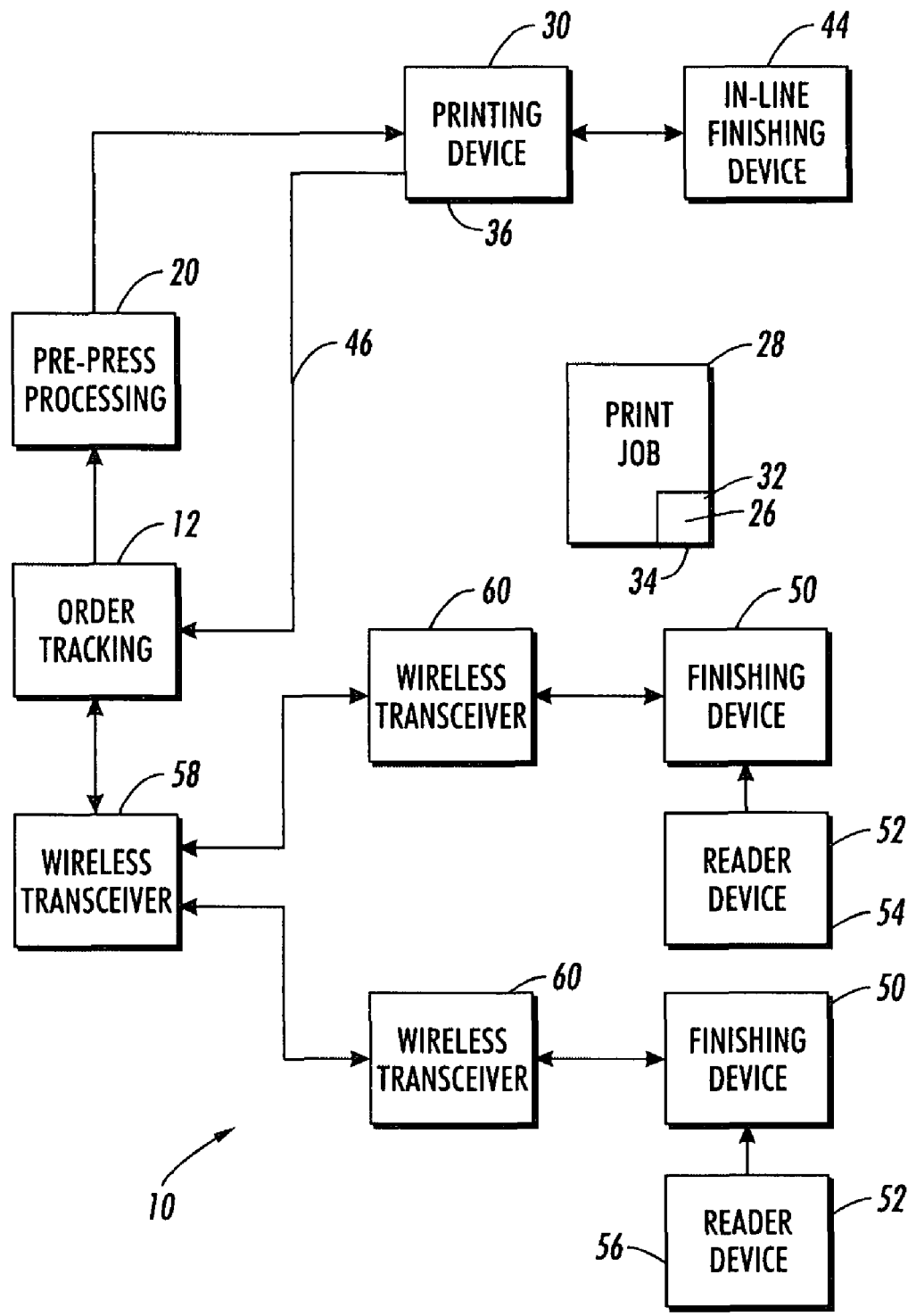
FIG. 1 is schematic diagram of a print shop having finishing devices in accordance with the disclosure.
Figure 2:
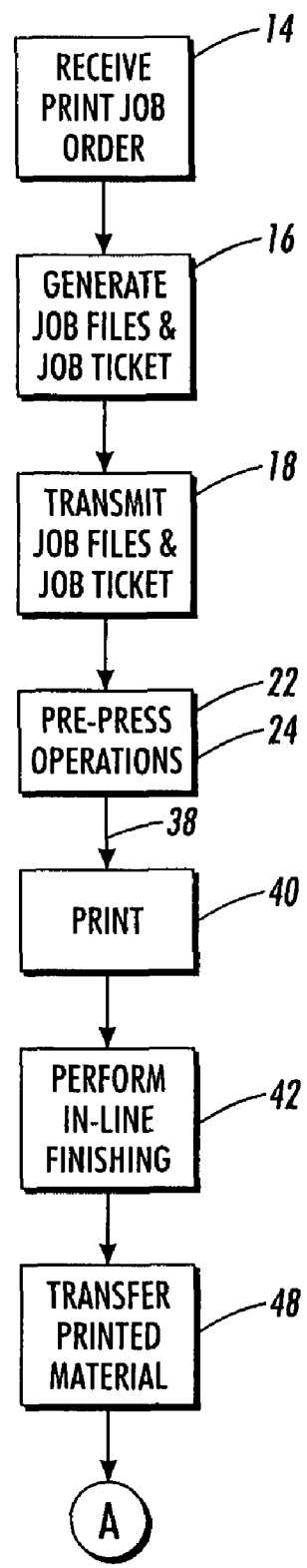
FIGS. 2 and 3 are a flow diagram of a method of finishing printed products in accordance with the disclosure.
Figure 3:
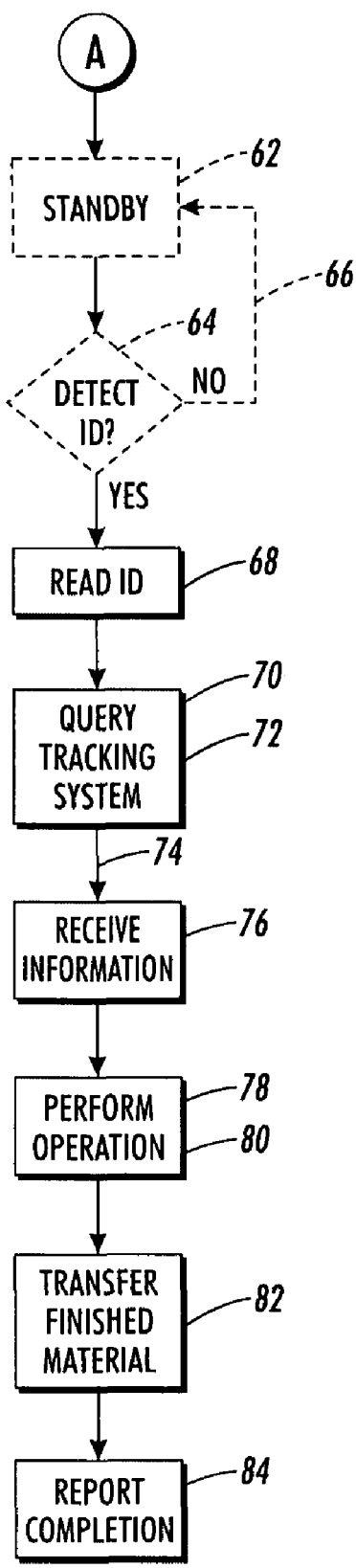

With reference to the drawings wherein like numerals represent like parts throughout the several figures, a print shop having a connected offline finishing device in accordance with the present disclosure is generally designated by the numeral 10.

The print shop 10 includes an order tracking system 12 that assigns a unique order ID for each print job order received 14 by the print shop 10. The order tracking system 12 generates 16 a job ticket having all the processing, printing and finishing information required to complete the print job, generally using a standard ticketing format, such as JDF. The order tracking system 12 monitors the print job as it is completed in the print shop and keeps track of all the print shop apparatus settings that are required to complete the print job.

The job files and the job ticket are transmitted 18 to the pre-press processing system 20, where they are prepared 22 and modified as required. The pre-press processing system 20 also assigns 24 a unique job identifier 26, based on the unique order ID to the job files to identify them. This job identifier 26 may be in the form of a printed mark, such as a barcode or a glyph 32, that is printed, along with the print job 28, at the printing device 30. Generally, the barcode or glyph 32 is placed in an area of the print job 28 that is intended to be trimmed to avoid modifying the final output of the print job 28.

Alternatively, the job identifier 26 may be in the form of data stored in an electronic data storage device 34 that is incorporated into one or more pages of a print job 28 by the printing device 30 or a programming device 36. An "electronic data storage device" (EDSD) is a machine-writeable and machine-readable device capable of storing electronic data. Electronic data storage device refers to a single electronic data storage device as well as to a collection of two or more electronic data storage devices connected, for example, in series, in parallel, or nested one within another. Examples of electronic data storage devices 34 include, but are not limited to, radio frequency identification tags (RFID tags), proximity (Prox) tags, iButtons, smartcards, and similar devices. The EDSD may be incorporated into a page of the print job 28 by attaching or mounting the EDSD on a surface of the page, embedding the EDSD within the page, or printing the EDSD directly on the page with the printing device. The EDSD 34 may also be placed in an area of the print job that is intended to be trimmed. Inconspicuous electronic data storage devices may be placed anywhere on the print job and remain with the print job.

The job files and the job ticket are then transmitted 38 to the printing device 30, where they are printed 40 and partially finished 42 using any in-line finishing devices 44 available (e.g. binder, book maker, etc). Job status updates are automatically transmitted 46 from these devices 44 to the order tracking system 12. After the print job 28 has been printed and completed in-line finishing, the print job 28 is transmitted 48 to offline finishing devices 50 to complete the print job. An "offline finishing device" is hereby defined to be any finishing device that is not in communication with the order tracking system or other central computer system. Conventionally, the process steps performed by offline finishing devices 50 must be set up manually. That is, the operator would have to obtain the original job order and set the finisher settings prior to continuing the job. In addition, once the offline finishing is completed, the operator will have to manually update the order tracking system to reflect the output of the finishing step. As any other manual step, this step is time consuming and prone to operator error.

In the subject system and method, each connected offline finishing device 50 is modified to include a reader device 52 adapted to read the job identifier 26 carried on the print job 28. If the job identifier 26 is a barcode or glyph 32, the reader device 52 will be an optical scanning device 54 having a resolution suitable for reading the barcode or glyph 32. If the job identifier 26 is data, the reader device 52 will be a scanner/reader device 56 suitable for sensing and querying the electronic data storage device 34 on which the data is stored. The order tracking system 12 and each off-line finishing device 50 are also modified to include wireless transceivers 58, 60.

Generally, the reader device 52 at each finishing device 50 will be in a standby mode 62, awaiting arrival of print jobs 28 from the printing device 30 or other finishing devices 50. For example, a RFID reader will detect 64 the presence of an RFID tag when the RFID tag is moved within the range of the RFID reader 56. If an RFID tag is not detected 66, the RFID reader 56 remains in standby mode 62. Similarly, some optical scanners 54 have sensors for detecting when a sheet of paper is placed on the scanning surface and can be programmed to automatically scan such a sheet of paper to read 68 a barcode or glyph 32 printed thereon. Alternatively, the reader device 52 may be manually activated to read the job identifier 26 of each print job 28 that is received at the finishing device 50. The finishing device 50 queries 70 the order tracking system 12 for finishing information for the print job 28, the wireless transceiver 60 associated with the finishing device 50 transmits 72 the job identifier 26 read by the reader device 52 and information regarding the finishing device 50 (e.g. laminator, trimmer, etc.) to the wireless transceiver 58 associated with the order tracking system 12. The order tracking system 12 transmits 74 the job ticket previously sent to pre-press processing system 20 to the finishing device 50 by way of the wireless transceivers 58, 60. The finishing device 50 reads 76 the job ticket information, configures 78 itself in accordance with the finishing information, and performs 80 the finishing operation.

When the finishing operation is completed, the print job 28 is transferred 82 to another finishing device 50 or for distribution to the customer, as required. The finishing device 50 reports 84 completion of the finishing operation to the order tracing system 12 via the wireless transceivers 60, 58.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of finishing printed products comprises:
   receiving each new print job at an order tracking system;
   generating job files and a job ticket with the order tracking system;
   transmitting the job files and job ticket from the order tracking system to a pre-press processing system;
   generating a unique job identifier with the pre-press processing system;
   associating the job identifier with the job files and job ticket;
   printing a print job;
   incorporating the job identifier in the print job; and
   finishing the print job with an offline finishing device by reading the job identifier with a reader device associated with the offline finishing device,
   querying a central computer for finishing information for the print job associated with the job identifier, and
   performing a finishing operation identified by the central computer.

2. The method of claim 1 wherein querying the central computer comprises
   transmitting the job identifier and identification information for the offline finishing device to the order tracking system with a wireless transceiver associated with the offline finishing device; and
   transmitting the job ticket to the offline finishing device with a wireless transceiver associated with the order tracking system.

3. The method of claim 2 wherein performing the finishing operation comprises:
   reading the job ticket finishing information associated with the offline finishing device; and
   configuring the offline finishing device as required by the job ticket finishing information.

4. The method of claim 1 further comprising monitoring completion of the print job with the order tracking system by reporting completion of the finishing operation to the order tracking system with the wireless transceiver associated with the offline finishing device.

5. The method of claim 1 wherein the job identifier is a printed mark and incorporating the job identifier in the print job comprises printing the printed mark on the print job while printing the print job.

6. The method of claim 1 wherein the job identifier is electronic data and incorporating the job identifier in the print job comprises storing the job identifier in an electronic data storage device mounted to the print job.

7. The method of claim 1 wherein the job identifier is electronic data and incorporating the job identifier in the print job comprises printing an electronic data storage device including the job identifier on the print job on the print job.

* * * * *